United States Patent [19]
Kudo et al.

[11] Patent Number: 4,562,507
[45] Date of Patent: Dec. 31, 1985

[54] PROTECTIVE RELAY

[75] Inventors: Hiroyuki Kudo; Atsumi Watanabe; Hiroshi Sasaki, all of Hitachi, Japan

[73] Assignee: Hitachi, Ltd., Tokyo, Japan

[21] Appl. No.: 573,137

[22] Filed: Jan. 23, 1984

[30] Foreign Application Priority Data

Jan. 24, 1983 [JP] Japan .................................. 58-10213

[51] Int. Cl.⁴ .............................................. H02H 3/26
[52] U.S. Cl. ........................................ 361/85; 361/82;
361/84; 361/67
[58] Field of Search ....................... 361/85, 80, 81, 67,
361/68, 82, 84

[56] References Cited

U.S. PATENT DOCUMENTS

| | | | |
|---|---|---|---|
| 3,379,934 | 4/1968 | Hoel et al. | 361/80 |
| 3,832,601 | 8/1974 | Hinman, Jr. et al. | 361/85 |
| 3,890,544 | 6/1975 | Chamia | 361/80 |
| 4,447,845 | 5/1984 | Wilkinson | 361/80 |

FOREIGN PATENT DOCUMENTS

| | | | |
|---|---|---|---|
| 78313 | 5/1982 | Japan . | |
| 526981 | 2/1976 | U.S.S.R. | 361/85 |
| 570951 | 8/1977 | U.S.S.R. | 361/85 |

Primary Examiner—Patrick R. Salce
Attorney, Agent, or Firm—Antonelli, Terry & Wands

[57] ABSTRACT

A protective relay which hardly makes maloperation in itself regardless of mixing of low-order higher harmonics in its at least two sinusoidal input signals comprises a first and a second phase detection comparator generating two different-phase square signals indicative of the phase difference between the sinusoidal input signals, a first and a second timer receiving the square signals generated from the first and second phase detection comparators respectively and generating their output signals as a result of comparison between a first period of time and one of the periods or the period of presence or absence of the square signals, a third timer receiving the same square signal as that applied to the first timer and generating its output signal as a result of comparison between a second period of time and the other period or the period of absence or presence of the square signal, a fourth timer receiving the same square signal as that applied to the second timer and generating its output signal as a result of comparison between the second period of time and the other period or the period of absence or presence of the square signal, a first flip-flop set by the first timer and reset by the third timer, a second flip-flop set by the second timer and reset by the fourth timer, and a third flip-flop set and reset by an AND circuit and a NOR circuit respectively connected to the outputs of the first and second flip-flop.

10 Claims, 10 Drawing Figures

PROTECTIVE RELAY

BACKGROUND OF THE INVENTION

This invention relates to a protective relay which detects a fault occurring in a power system by detecting the phase difference between input signals indicative of the current and voltage respectively of the power system, according to the so-called direct phase comparison scheme, and more particularly to a protective relay of the type above described which can reliably operate regardless of mixing of low-order higher harmonics in the input signals.

Protective relays are devices which detect a fault occurring in a power system on the basis of changes of the amplitude and phase of input signals, and it is the aforementioned protective relay based on the direct phase comparison scheme which detects a fault by detecting a change of the phase difference between a plurality of input signals. Describing in more detail, two input signals are sliced, for example, at an approximately zero level respectively to obtain square signals, and a coincidence signal is then obtained which is indicative of the period during which both of the square signals are positive (or negative). This coincidence signal is a signal corresponding to the phase difference between the two input signals, and it is decided that a fault has occurred in the power system when the phase difference exceeds, for example, $\pi/2$ rad although it should be normally less than $\pi/2$ rad. A distance relay is a typical example of the protective relay of the type above described. In the case of this distance relay, the following two vector quantities $\dot{E}_1$ and $\dot{E}_2$ are calculated on are calculated on the basis of the current I and voltage V of the power system to provide the two inputs subjected to the direct phase comparison:

$$\dot{E}_1 = \dot{V} - \dot{I}\dot{Z}_s \quad (1)$$

$$\dot{E}_2 = \dot{I}\dot{Z}_s \quad (2)$$

In the above equations (1) and (2), $\dot{Z}_s$ is a setting impedance, and $\dot{E}_1$ and $\dot{E}_2$ are generally called a distance measuring input and a polar input to the distance relay respectively. Further, $\dot{V}$, $\dot{I}$ and $\dot{Z}_s$ are expressed as follows using the phase angle $\alpha$ and characteristic angle $\theta$:

$$\dot{V} = V\epsilon^{j\omega t} \quad (3)$$

$$\dot{I} = I\epsilon^{j(\omega t - \phi)} \quad (4)$$

$$\dot{Z}_s = Z_s\epsilon^{j\theta} \quad (5)$$

Suppose that the operating boundary equation of this distance relay receiving the vector quantities $\dot{E}_1$ and $\dot{E}_2$ as the two inputs is expressed by $$\dot{R}(\dot{E}_1 \cdot \dot{E}_2) = 0 \quad (6)$$

Then, the well-known phase characteristic of reactance type is obtained, and the distance relay operates when the following equation is satisfied:

$$V/I \sin \theta = X \leq Z_s \quad (7)$$

where $$\theta = 90°, \omega T = \omega T' = 90° \quad (8)$$

This direct phase comparison scheme is employed in most of protective relays because of the recent tendency of constructing the protective relays themselves by logical components including transistors, IC's and LSI's.

FIG. 1 shows the structure of a distance relay which is one form of a prior art protective relay based on the direct phase comparison scheme, and FIG. 2 shows the waveforms of inputs to and outputs from the various components of the distance relay. The structure and operation of the prior art protective relay will be explained with reference to FIGS. 1 and 2.

The inputs $\dot{E}_1$ and $\dot{E}_2$ to the prior art circuit shown in FIG. 1 correspond to the aforementioned distance measuring input and polar input respectively which are obtained from the combination of the input voltage $\dot{V}$ and input current $\dot{I}$ of this distance relay. These two inputs $\dot{E}_1$ and $\dot{E}_2$ are applied to phase detection comparators 3a and 3b through harmonic component attenuation filters 2a and 2b. In the phase detection comparators 3a and 3b, coincidence of positive and negative polarities of the two inputs is detected. For example, the phase detection comparator 3a generates an output of "1" level during the period of time in which both of the two inputs have the positive polarity, while it generates an output of "0" level in the remaining period of time. Similarly, the phase detection comparator 3b generates an output of "1" level during the period of time in which both of the two inputs have the negative polarity. Each of timing circuits or timers 4a and 4b in the next stage generates an output of "1" level when the duration of "1" level in its input exceeds a predetermined period of time T. On the other hand, another timing circuit or timer 4c generates an output of "1" level when the duration of "0" level in both of the outputs of the phase detection comparators 3a and 3b exceeds another predetermined period of time T'. A continuation circuit 6a generates an output of "1" level as soon as the timer 4a generates its output of "1" level, and such an output of the circuit 6a continues until the timer 4c generates its output of "1" level. Similarly, another continuation circuit 6b generates an output of "1" level as soon as the timer 4b generates its output of "1" level, and such an output of the circuit 6b continues until the timer 4c generates its output of "1" level. A logical circuit 7 is an AND (or an OR) circuit connected to the outputs of the continuation circuits 6a and 6b. That is, in this circuit 7, the result of phase comparison between the positive waveform portions of the distance measuring input and polar input is collated with the result of phase comparison between the negative waveform portions of the two inputs.

The circuit shown in FIG. 1 is already commonly known from, for example, FIG. 8 of Japanese Patent Application Laid-open No. 57-78313 (1982).

In FIG. 1, one of the phase detection comparators 3, one of the continuation circuits 6, the timer 4a for setting the continuation circuit 6, and the timer 4c for resetting the continuation circuit 6 are only those required for the purpose of phase comparison. Actually, however, these components are provided in duplex with the suffixes a and b attached thereto, so that the system a confirms the duration of coincident positive waveform portions, and the system b confirms the duration of coincident negative waveform portions. The continuation circuits 6a and 6b are indispensable so that the intermittent outputs of the timers 4a and 4b can be turned into a continuous output thereby facilitating later processing. The logical circuit 7 is illustrated as an AND circuit in FIG. 1 because application of the output signals from the two systems to an AND circuit is convenient for improving the reliability of operation of the protective relay. On the other hand, employment of an OR circuit as this logical circuit 7 is suitable for high-speed generation of the output from the protective relay.

FIG. 2 shows the waveforms of the outputs of the various parts of FIG. 1 before and after occurrence of a fault. (In FIG. 2, the waveform of the inputs is limited to the fundamental waveform before and after occurrence of a fault.)

The operation of the circuit shown in FIG. 1 will be briefly described with reference to FIG. 2. Suppose that each of the periods of time T and T' timed or measured by the timers 4 corresponds to an angle of 90°. Suppose also that the phase difference (which is herein the duration of coincidence of the positive or negative polarity) exceeds 90° although it is less than 90° before occurrence of a fault. It will be apparent from the waveform diagram of FIG. 2 that the polarity coincidence outputs of the phase detection comparators 3a and 3b are alternately generated at intervals of 180° in the waveform stabilized state before or after occurrence of the fault. The timers 4a and 4b generate their outputs alternately by detecting the fact that the duration of the polarity coincidence outputs of the phase detection comparators 3a and 3b has exceeded 90° after occurrence of the fault. On the other hand, when the angle indicating the polarity non-coincidence is considered, it is larger than 90° before occurrence of the fault and is smaller than 90° after occurrence of the fault. Therefore, the timer 4c generates periodically its output before the fault occurs. Thus, the reset inputs are applied to the reset terminals only of the continuation circuits 6a and 6b (which are flip-flops herein) so that the outputs of the flip-flops 6a and 6b are maintained in their "0" level before the fault occurs. The set inputs are first applied to the set terminals of the flip-flops 6a and 6b after occurrence of the fault, and their outputs of "1" level are applied to the logical circuit 7, so that the logical circuit 7 generates its output of "1" level after occurrence of the fault. Then, when the source of the fault is removed, and the original input waveforms are applied to the respective filters 2a and 2b, the timer 4c generates its output of "1" level again to reset the flip-flops 6a and 6b. It will thus be seen that the timer 4c generates its output of "1" level before occurrence of a fault, while the timers 4a and 4b generate their outputs of "1" level after occurrence of a fault, thereby ensuring proper operation of the protective relay.

Needless to mention, a protective relay is so constructed as to make its normal operation when a sinusoidal input having a predetermined frequency is applied thereto. In the case of the aforementioned protective relay based on the direct phase comparison scheme, the angle of $\pi/2$ rad is used as the reference for deciding operation or non-operation of the protective relay when the input is a sinusoidal input having a predetermined frequency of, for example, 50 Hz, and whether or not the protective relay is in actual operation is decided on the basis of whether or not the duration of the coincidence outputs applied to the timers 4 in FIG. 1 exeeds the value of 5 msec corresponding to the value of $\pi/2$ rad selected when the input frequency is 50 Hz.

Therefore, the normal operation of the protective relay cannot be expected when the input applied to the protective relay includes a component other than the sinusoidal waveform having the predetermined frequency (which waveform will be referred to hereinafter as a fundamental component). It can be readily understood that mixing of a higher harmonic provides a coincidence signal of, for example, 95° or 80° although the coincidence signal of, for example, 80° or 95° should appear when the proper fundamental component is applied. In the former case, so-called wrong operation results, while, in the latter case, so-called wrong non-operation results. It is also expected that the length of time required for the protective relay to be placed in operation or to be released is extended.

FIG. 3 shows the waveforms of the outputs of the various parts in FIG. 1 in the event of mixing of a higher harmonic. It will be seen in FIG. 3 that mixing of an nth-order higher harmonic $\dot{V}_n$ in the proper fundamental component $\dot{V}_1$ provides a composite waveform $\dot{V}_1 + \dot{V}_n$. It can be seen in FIG. 3 that, although the polarity coincidence signals are generated from the phase detection comparators 3a and 3b, the regularity of the outputs of the phase detection comparators 3a and 3b is now lost and such outputs do not appear at intervals of 180°. It can also be seen that the duration of such outputs is not constant in FIG. 3 whereas it is almost constant in FIG. 2. In the case of the timers 4a, 4b and 4c too which generate their outputs in response to the application of the inputs from the phase detection comparators 3a and 3b, these outputs lack also the regularity shown in FIG. 2. That is, in the case of FIG. 2 in which the fundamental component only is applied, the timer 4c generates its output before occurrence of a fault, while the timers 4a and 4b generate their outputs after occurrence of the fault thereby ensuring proper operation of the protective relay. In contrast, in the case of FIG. 3, the situation of output generation from the timers 4a, 4b and 4c is utterly random. As a result, the flip-flops 6a and 6b are alternately set and reset within a shorter period of time, and the output of the logical circuit 7 in the final stage is rendered instable. Such an output of the logical circuit 7 cannot be based to decide whether or not the protective relay is in operation. Thus, mixing of a higher harmonic in the input leads to an incomplete operation of the protective relay.

As is well known, it is impossible to completely prevent generation of higher harmonics in a power system. Turning on-off of thyristors or like converters or turning on-off of various reactances and capacitances in the power system leads necessarily to generation of a great deal of higher harmonics over a wide range of orders, and provision of power filters for the purpose of absorption of such higher harmonics results in a large scale and a high cost. It has therefore been a common practice to provide suitable means in the protective relay to deal with the higher harmonics. According to the prior art practice, therefore, filters have been disposed in the relay input stage to absorb the higher harmonics included in the input thereby minimizing the adverse effect of the higher harmonics.

However, with the modern tendency toward the larger transmission capacity and larger distance of power systems and, also, with the progressive distribution of underground transmission cables, the increase in the system electrostatic capacity and reactance component leads to lowering of the harmonic orders of higher harmonics generated in the event of occurrence of a fault. Conventional filters are designed primarily for attenuation of higher harmonics of third and higher orders. However, because of the fact that resonance oscillation in the vicinity of a higher harmonic of second order occurs in UHV transmission systems, the conventional filter is unable to sufficiently attenuate such a harmonic component. On the other hand, an increase in the attenuation factor of the filter for discrimination between the fundamental component and the second-order harmonic component leads to such a defect that the time constant thereof increases by about ¼ cycle thereby degrading the high-speed operation performance of the protective relay by 1 to 2 cycle.

SUMMARY OF THE INVENTION

It is therefore a primary object of the present invention to provide a protective relay which hardly makes mal-operation in itself in response to a higher harmonic input, without the necessity for providing powerful input filters to deal with the problem of mixed higher harmonics.

In accordance with the present invention which attains the above object, there is provided a protective relay comprising two first circuits generating two different square signals indicative of the phase difference between at least two sinusoidal inputs signals, two second circuits generating two square signals depending on the period of presence or absence of said first-mentioned two square signals respectively, and a third circuit including logical circuits generating a single output representing the logical product or sum of the second-mentioned two square signals.

BRIEF DESCRIPTION OF THE DRAWINGS

FIG. 10 illustrates the effect of the protective relay of the direct phase comparison type according to the present invention, wherein.

DESCRIPTION OF THE PREFERRED EMBODIMENTS

Figure 4:
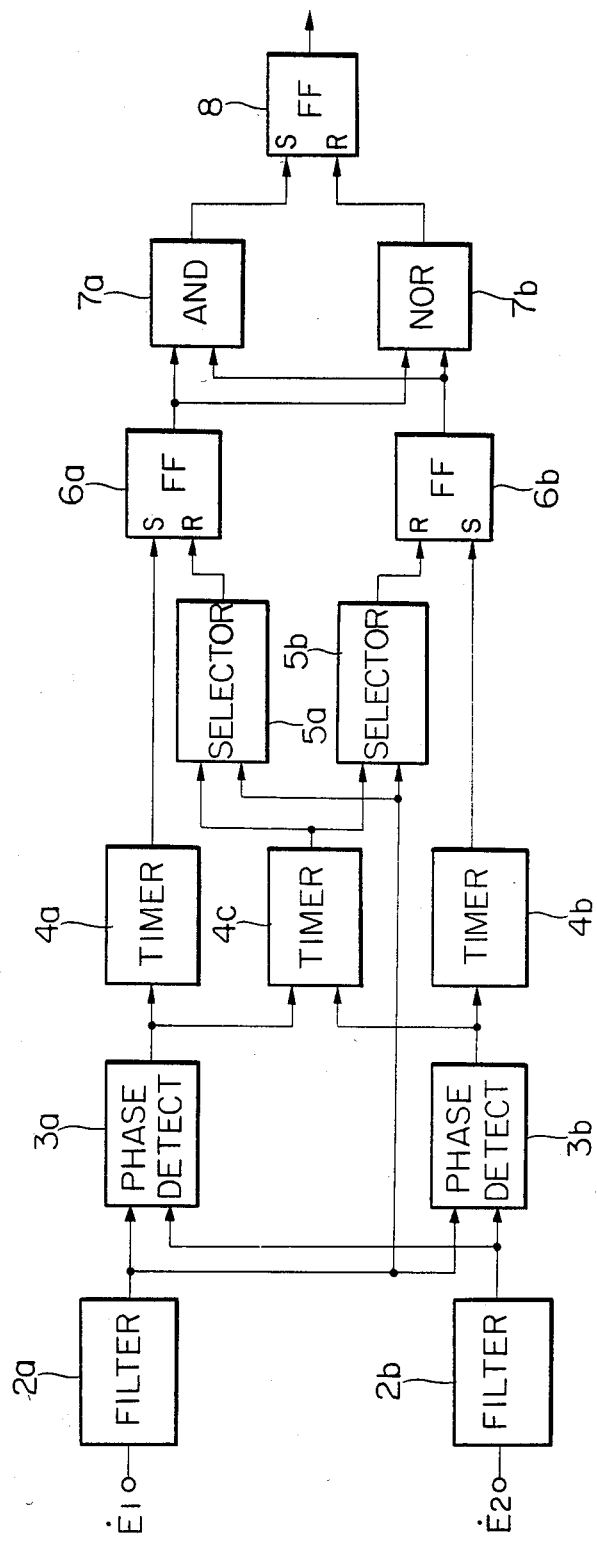
FIG. 4 is a block diagram showing schematically the structure of an embodiment of the protective relay of the direct phase comparison type according to the present invention.
Figure 5:
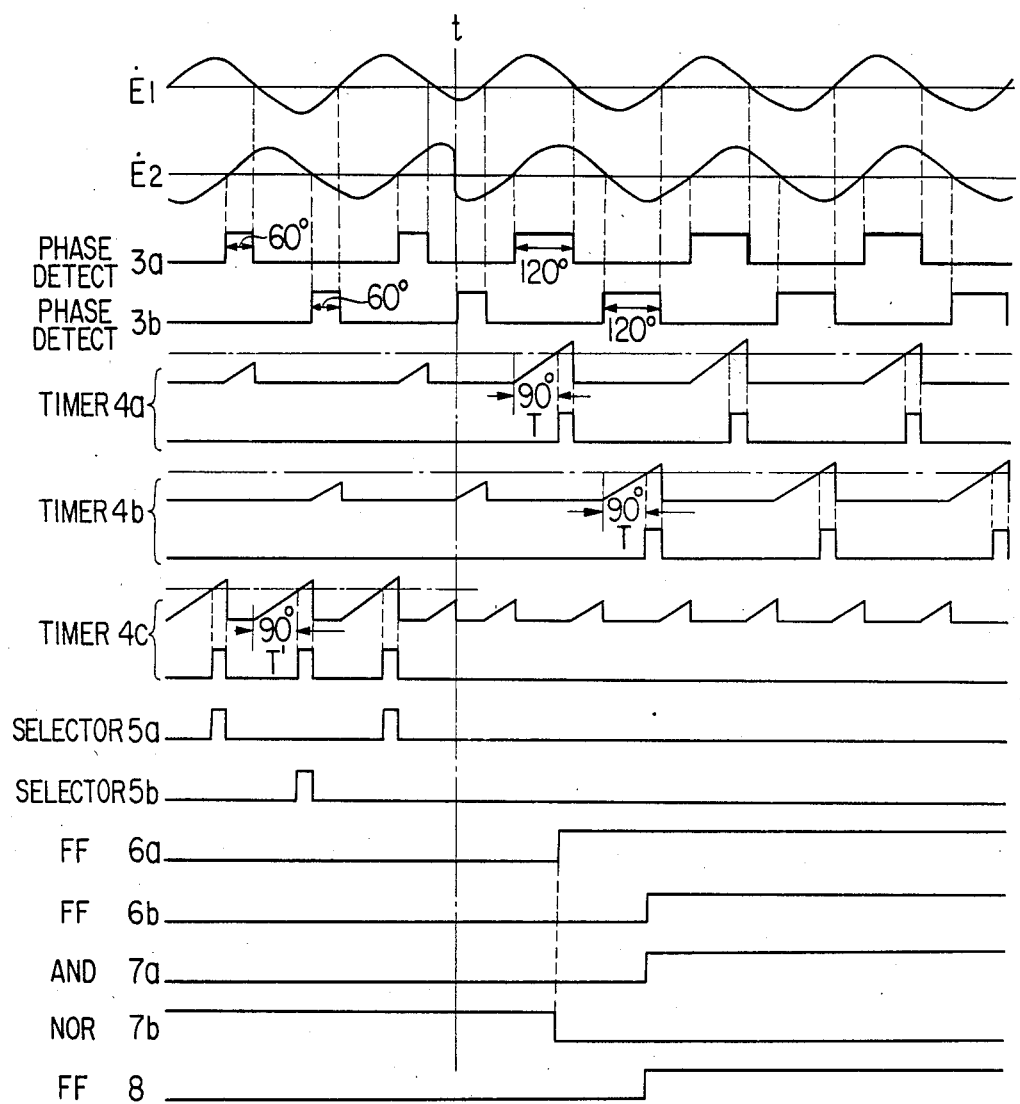
FIG. 5 shows the waveforms of outputs from the various parts in FIG. 4 when a fundamental waveform inputs are applied to the protective relay.

FIG. 4 shows schematically the structure of an embodiment of the protective relay according to the present invention, and FIG. 5 shows the waveforms of outputs appearing from the various parts in FIG. 4 before and after occurrence of a fault when fundamental waveform inputs signal are applied to the protective relay. First, the structure of the embodiment of the present invention and the operation of the protective relay in the absence of a mixed higher harmonic will be described with reference to FIGS. 4 and 5.

Inputs $\dot{E}_1$ and $\dot{E}_2$ to the circuit of the present invention shown in FIG. 4 correspond to a distance measuring input and a polar input respectively which are obtained from the combination of an input voltage $\dot{V}$ and an input current $\dot{I}$ of a power system to which this protective relay is connected. These two inputs $\dot{E}_1$ and $\dot{E}_2$ are applied to phase detection comparators $3a$ and $3b$ through harmonic component attenuation filters $2a$ and $2b$ which are suitably provided. In the phase detection comparators $3a$ and $3b$, coincidence of positive and negative polarities of their two inputs is detected. For example, the phase detection comparator $3a$ generates an output of "1" level during the period of time in which both of the two inputs have the positive polarity, while it generates an output of "0" level in the remaining period of time. Similarly, the phase detection comparator $3b$ generates an output of "1" level during the period of time in which both of the two inputs have the negative polarity. Each of timing circuits or timers $4a$ and $4b$ generates an output of "1" level when the duration of "1" level in its input exceeds a predetermined period of time T. On the other hand, another timing circuit or timer $4c$ generates an output of "1" level when the duration of "0" level in both of the outputs of the phase detection comparators $3a$ and $3b$ exceeds another predetermined period of time T'.

Selectors $5a$ and $5b$ selectively apply the outputs of the timer $4c$ to continuation circuits $6a$ and $6b$ which are in the form of flip-flops. The selector $5a$ applies its output of "1" level to the reset terminal of the flip-flop $6a$ when the output of the timer $4c$ is in its "1" level and the output of the filter $2a$ is positive. The selector $5b$ applies its output of "1" level to the reset terminal of the flip-flop $6b$ when the output of the timer $4c$ is in its "1" level and the output of the filter $2a$ is negative. The flip-flop $6a$ is set by the output of the timer $4a$ and is reset by the output of the selector $5a$. The flip-flop $6b$ is set by the output of the timer $4b$ and is reset by the output of the selector $5b$. An AND circuit $7a$ provides an output of "1" level when both of the outputs of the flip-flops $6a$ and $6b$ are in their "1" level. A NOR circuit $7b$ provides an output of "1" level when both of the outputs of the flip-flops $6a$ and $6b$ are in their "0" level. Another flip-flop $8$ is set by the output of the AND circuit $7a$ and is reset by the output of the NOR circuit $7b$.

When the inputs applied to the circuit of the present invention having a structure as shown in FIG. 4 do not include a higher harmonic before and after occurrence of a fault, the outputs from the various parts in FIG. 4 have waveforms as shown in FIG. 5. In the case of the present invention, the filters $2a$ and $2b$ can be considered to remove higher harmonics of third and higher orders, and the inputs $\dot{E}_1$ and $\dot{E}_2$ to the respective filters 2a and 2b can be considered to be inputs to the phase detection comparators 3a and 3b.

FIG. 5 illustrates that a fault occurs at time t and the phase difference of the two inputs $\dot{E}_1$ and $\dot{E}_2$ changes at time t which is the change point. FIG. 4 illustrates the case in which the phase difference appearing as the outputs of the phase detection comparators 3a and 3b changes from 60° to 120°. That is, the phase detection comparators 3a and 3b which detect positive polarity coincidence and negative polarity coincidence respectively generate pulses having a period corresponding to an angle of 60° alternately before the time t and pulses having a period corresponding an angle of 120° alternately after the time t. Suppose that the timers 4a and 4b receiving the outputs of "1" level from the phase detection comparators 3a and 3b as its inputs respectively measure the period of time T=90°. Then, no outputs appear from these timers 4a and 4b before the time t, and outputs appear alternately from these timers 4a and 4b after the time t. Suppose, on the other hand, that the timer 4c receiving the outputs of "0" level from the phase detection comparators 3a and 3b as its inputs measures the period of time T'=90°. Then, this timer 4c continues to generate its output at intervals of $\pi$ rad before the time t. However, it ceases to generate its output after the time t, since the period of time in which the outputs of both of the phase detection comparators 3a and 3b are in their "0" level is shorter than $\pi/2$ rad after the time t.

The selectors 5a and 5b which reset the flip-flops 6a and 6b alternatively before the time t do not generate the reset outputs after the time t. When the fundamental waveform inputs only are applied to the circuit, the timers 4a, 4b, 4c and the selectors 5a, 5b generate pulse outputs as described above, and inputs are applied to the reset terminals only of the flip-flops 6a and 6b before the time t. Both of the flip-flops 6a and 6b generate their outputs of "0" level, and the outputs of the AND circuit 7a and NOR circuit 7b are in their "0" level and "1" level respectively. The flip-flop 8 in the final stage is reset by the output of "1" level from the NOR circuit 7b.

Suppose that a fault occurs at time t under such a situation. In response to the occurrence of the fault, one of the timers 4a and 4b generates now its output of "1" level earlier than the other, and the corresponding one of the flip-flops 6a and 6b generates its output of "1" level earlier than the other. (The flip-flop 6a in the case of FIG. 5.) The NOR circuit 7b generates now its output of "0" level to release the flip-flop 8 from its reset state. Then, when the flip-flop 6b is subsequently set, both of the flip-flops 6a and 6b generate now their outputs of "1" level, and the AND circuit 7a generates its output of "1" level, with the result that the flip-flop 8 provides a fault detection output. It will be seen from the above description that the protective relay according to the present invention responds properly to detect occurrence of a fault when such a fault occurs during application of the fundamental waveform, thereto.

How the protective relay of the present invention operates properly even in the case of superposition of a higher harmonic on the fundamental waveform will now be described in detail.

Figure 6:
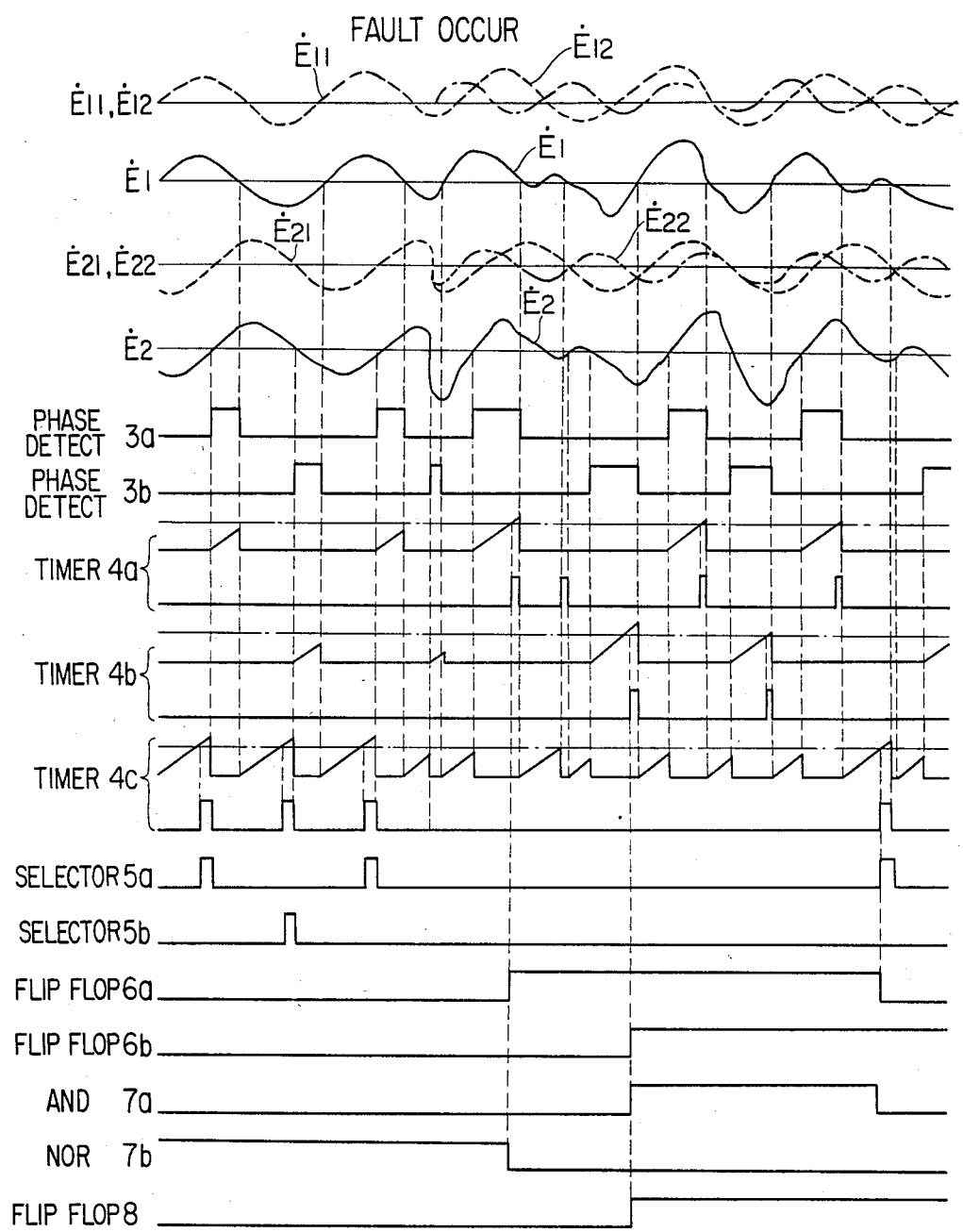
FIG. 6 shows the waveforms of outputs from the various parts in FIG. 4 when the inputs applied to the protective relay include a higher harmonic mixed therein.

Referring to FIG. 6, $\dot{E}_1$ represents a composite signal of a fundamental waveform component $\dot{E}_{11}$ and a higher harmonic component $\dot{E}_{12}$, and $\dot{E}_2$ represents also a composite signal of a fundamental waveform component $\dot{E}_{21}$ and a higher harmonic component $\dot{E}_{22}$. FIG. 6 illustrates that such higher harmonic components $\dot{E}_{12}$ and $\dot{E}_{22}$ appear after occurrence of a fault. The phase detection comparators 3a and 3b convert these input waveforms into square signals, and the timers 4a and 4b measure the duration of these square signal inputs to generate pulse outputs when the duration is longer than the predetermined period of time T. According to the previous description, the timers 4a and 4b generate their outputs of "1" level after occurrence of a fault, while the timer 4c generates its output of "1" level before occurrence of the fault, thereby ensuring the proper operation of the protective relay. In FIG. 6, however, an output of "1" level appears also from the timer 4c after occurrence of the fault. As first means for preventing mal-operation of the relay due to appearance of such an output from the timer 4c after occurrence of the fault, the flip-flops 6a and 6b are arranged to be reset depending on the polarity of the inputs. In the prior art relay shown in FIG. 1, the output of the timer 4c resets both of the flip-flops 6a and 6b at the same time, and the AND circuit 7 is turned off at that moment. In contrast to the prior art, one of the flip-flops 6a and 6b is only reset earlier than the other depending on the polarity of the corresponding input ($\dot{E}_1$ in the illustrated case) in the present invention. Thus, the flip-flop 6a is first reset when $\dot{E}_1$ is positive, while the flip-flop 6b is reset when $\dot{E}_1$ is negative, in the case illustrated in FIG. 6. Secondly, the elements disposed in the succeeding stages of the flip-flops 6a and 6b are so arranged that the AND logic of the outputs of the flip-flops 6a and 6b sets the flip-flop 8 in the final stage, and the NOR logic of the outputs of the flip-flops 6a and 6b resets the flip-flop 8.

According to the present invention as such, the timers 4a and 4b generate successively their outputs to set the flip-flops 6a and 6b respectively when the positive and negative polarity coincidence signals exceeding a predetermined angle appear after occurrence of the fault. Then, when both of the flip-flops 6a and 6b are placed in their set state, the output of the AND circuit 7a appearing at that time sets the flip-flop 8 in the final stage. Since this flip-flop 8 is arranged to be reset by the output of the NOR circuit 7b, the flip-flop 8 continues to generate its output of "1" level until both of the flip-flops 6a and 6b are reset. Since the selectors 5a and 5b are provided for individually or independently resetting the flip-flops 6a and 6b as described above, there is no possibility that the flip-flops 6a and 6b are reset at the same time. Even if one of the flip-flops 6a and 6b is reset, this flip-flop 6a or 6b is immediately set from its reset state again by the set input applied from the timer 4 under the faulty situation. Thus, there is no possibility that both of the flip-flops 6a and 6b are placed in their reset state at the same time. According to the present invention, therefore, the protective relay can continuously maintain its operation output even when the timer 4c which should generate its output before occurrence of a fault might generate its output after occurrence of the fault due to superposition of a higher harmonic of second-order on the fundamental input waveform.

Figure 1:
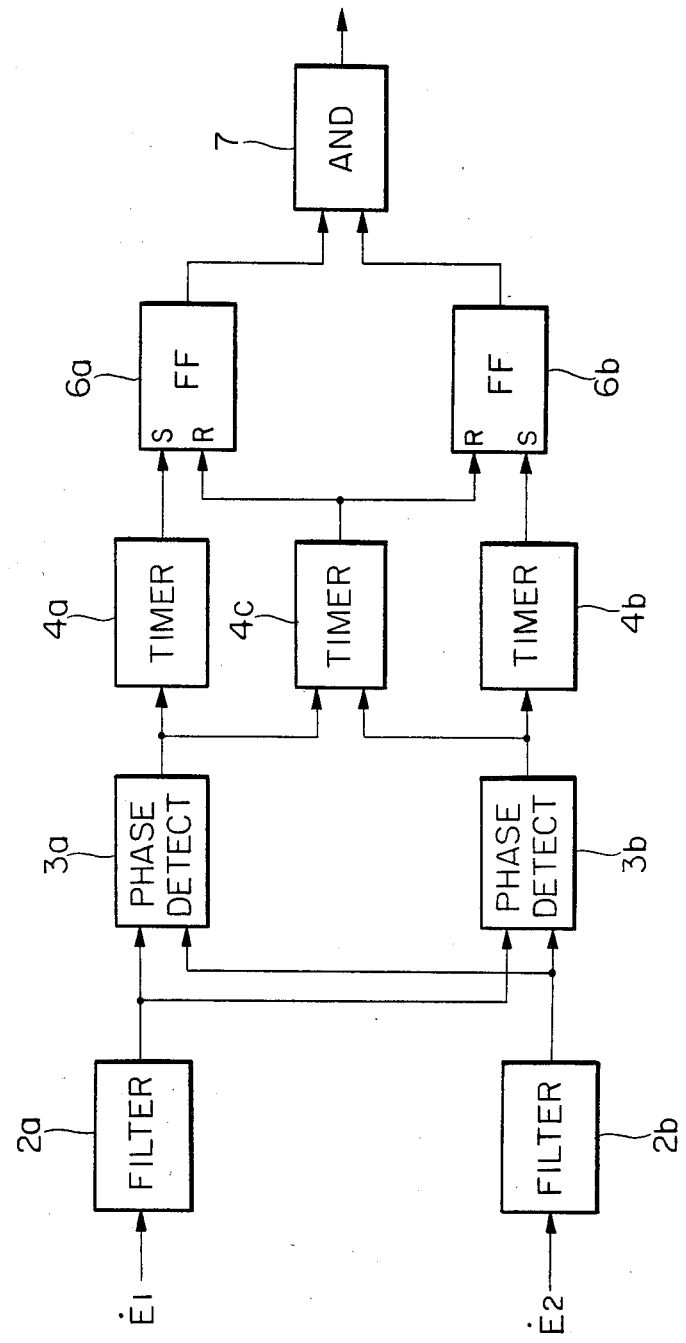
FIG. 1 is a block diagram showing schematically the structure of a prior art protective relay of the direct phase comparison type.
Figure 2:
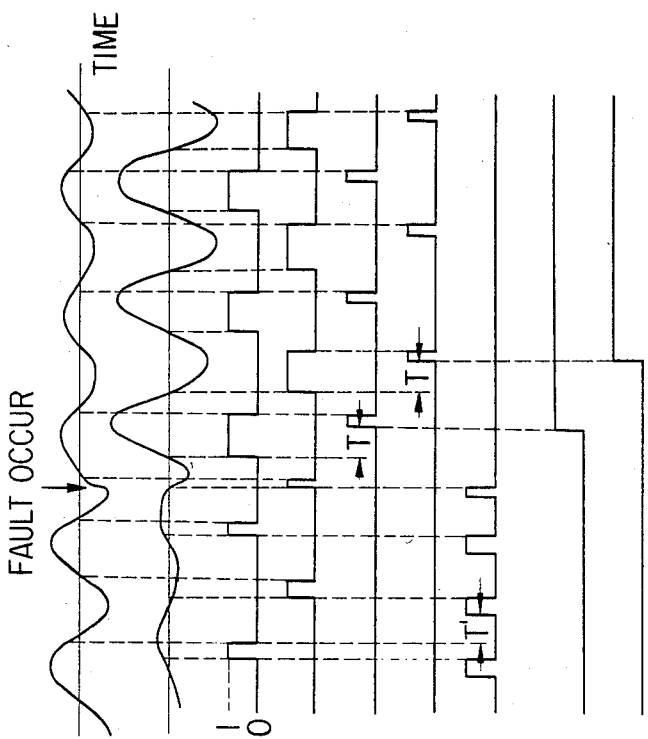
FIG. 2 shows the waveforms of outputs from the various parts in FIG. 1 when fundamental waveform inputs are applied to the protective relay.
Figure 3:
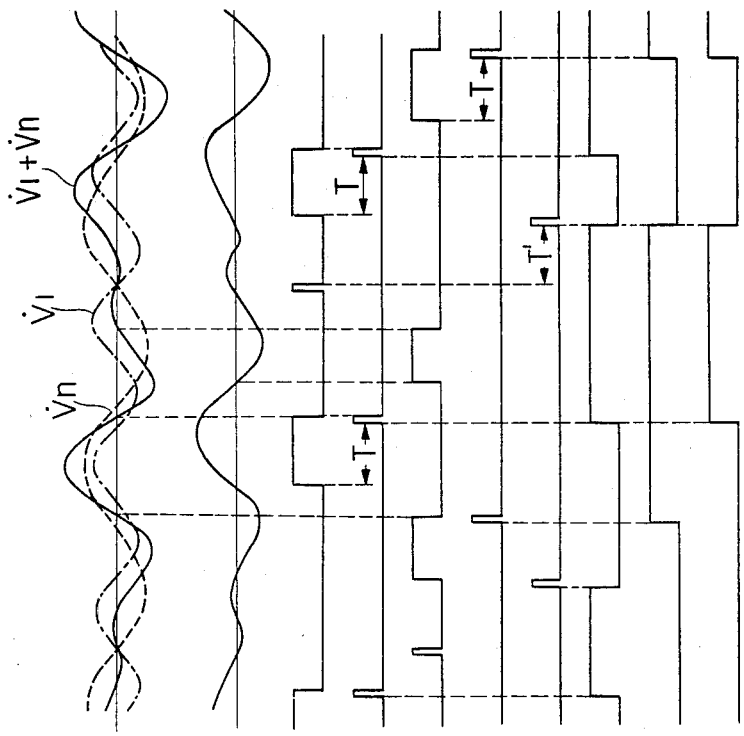
FIG. 3 shows the waveforms of outputs from the various parts in FIG. 1 when the inputs applied to the protective relay include a higher harmonic mixed therein.

According to the embodiment described above, a reliable and useful protective relay can be provided by merely adding a circuit of relatively simple structure including the elements 5a, 5b, 7b and 8 to the circuit of the prior art relay shown in FIG. 1, and the relay can operate at a high speed equivalent to that of the prior art relay since the added circuit does not include a filter operating with a delay time due to its time constant.

In the embodiment of the present invention shown in FIG. 4, the polarity of the distance measuring input applied to the filter 2a is used as an input to each of the selectors 5a and 5b. However, the effect is generally similar even when the polarity of the polar input applied to the filter 2b may be used as such an input.

Further, in lieu of detecting the polarity coincidence between the two inputs in the phase detection comparators 3a and 3b, the circuit shown in FIG. 4 can achieve the similar function even when polarity non-coincidence between the two inputs is detected.

Figure 7:
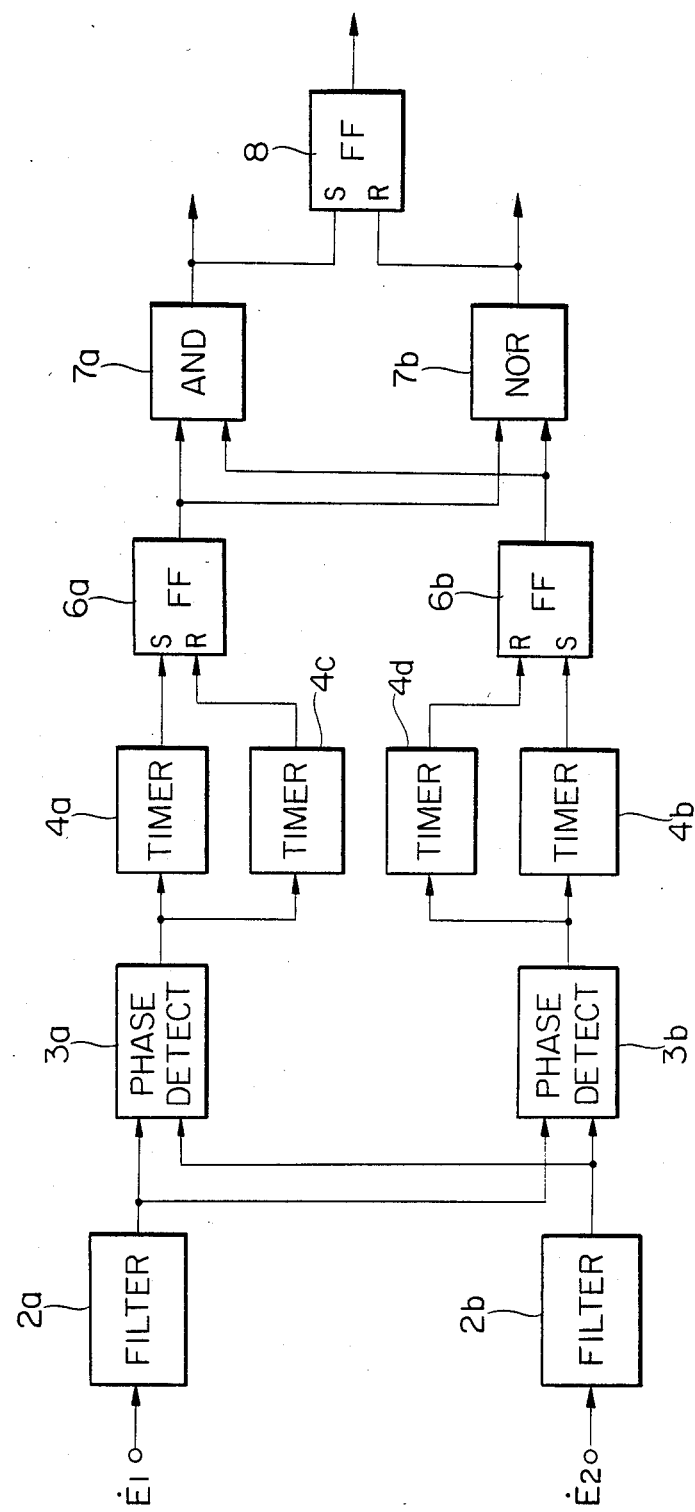
FIG. 7 is a block diagram showing schematically the structure of another embodiment of the protective relay according to the present invention.

Another embodiment of the present invention shown in FIG. 7, which is a modification of that shown in FIG. 4, includes two pairs of timers 4a, 4b and 4c, 4d for timing or measuring the period of simultaneous appearance of positive waveform portions and negative waveform portions respectively, thereby eliminating the selectors 5a and 5b shown in FIG. 4. The timers 4a and 4b in FIG. 7 measure a predetermined period of time T for setting the flip-flops 6a and 6b, while the timers 4c and 4d measure another predetermined period of time T' for resetting the flip-flops 6a and 6b. This embodiment is advantageous in that, in addition to the decreased number of circuit elements, the elements are separated into a circuit system associated with the positive waveform and a circuit system associated with the negative waveform, so that the relay output can be provided by one of the circuit systems even when the other is faulty or not properly operative.

Figure 8:
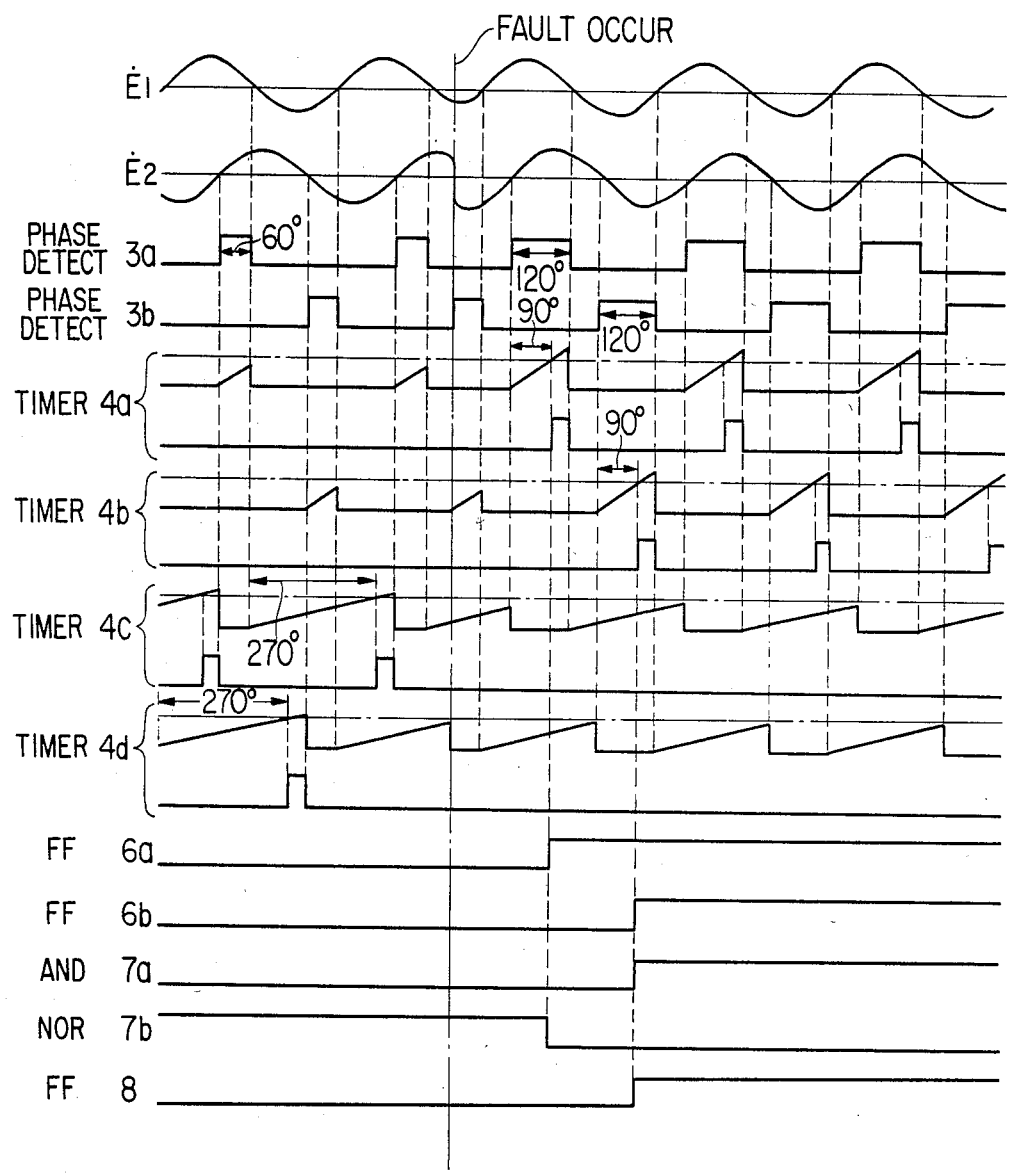
FIG. 8 shows the waveforms of outputs from the various parts in FIG. 7 when fundamental waveform inputs are applied to the protective relay.
Figure 9:
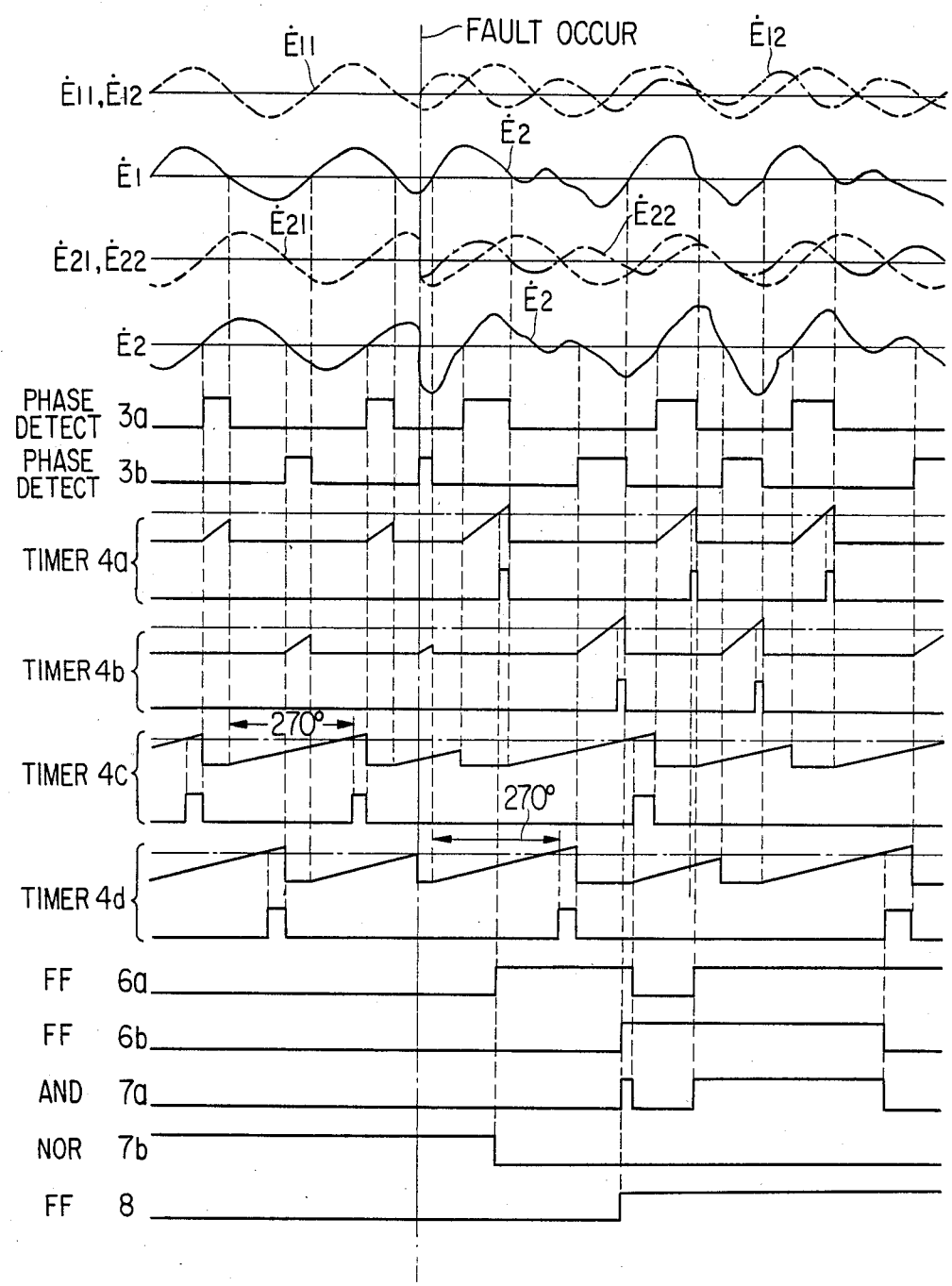
FIG. 9 shows the waveforms of outputs from the various parts in FIG. 7 when the inputs applied to the protective relay include a higher harmonic mixed therein.

FIGS. 8 and 9 show waveforms of outputs from the various parts of FIG. 7 when T measured by the timers 4a and 4b is selected to be 90°, while T' measured by the timers 4c and 4d is selected to be 270°. FIG. 8 illustrates the case where a fault occurs during application of fundamental waveform inputs only, while FIG. 9 illustrates the case where a higher harmonic of relatively low order mixes in the fundamental waveform inputs. It will be apparent from FIG. 9 that, although mixing of such a higher harmonic causes repeated on-off of the flip-flops 6a and 6b after occurrence of the fault, setting of the flip-flop 8 in the final stage by the output of the AND circuit 7a and resetting of this flip-flop 8 by the output of the NOR circuit 7b stabilizes the output of the flip-flop 8.

Figure 10A:
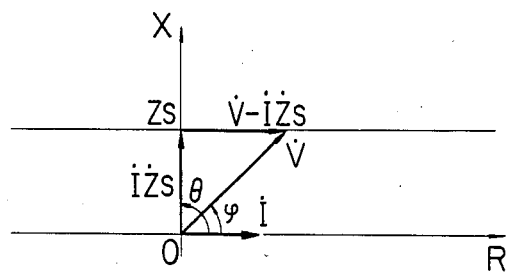
FIG. 10a shows the well-known reactance characteristic.
Figure 10B:
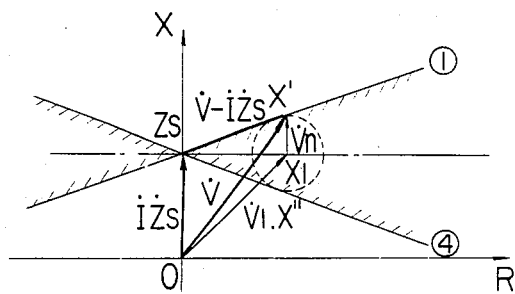
FIG. 10b illustrates how an unstable operation zone appears in the reactance characteristic due to mixing of a higher harmonic.

The reason why the protective relay according to the present invention hardly makes mal-operation in itself in response to a higher harmonic input will be briefly described. While the protective relay of the present invention can exhibit various characteristics when two vector quantities applied as its inputs are changed, the application of the present invention to a well-known reactance relay will merely be described by way of example. Such a relay operates when the phase difference between an input $\dot{E}_1 = \dot{V} - \dot{I}\dot{Z}_s$ given by the equation (1) and an input $\dot{E}_2 = \dot{I}\dot{Z}_s$ given by the equation (2) exceeds 90°, and its operation zone depicted on an impedance plane is as shown in FIG. 10a where the horizontal axis represents the resistance R and the vertical axis represents the reactance X. It will be seen in FIG. 10a that the reactance characteristic is primarily indicated by a line on which the reactance $Z_s$ is constant and which separates an unstable operation zone from a stable operation zone. In contrast, FIG. 10b illustrates the case in which $\dot{V}$ is given by $\dot{V} = \dot{V}_1 + \dot{V}_n$. This input $\dot{V}$ is the vector which can exist only within the dotted circle in FIG. 10b. Therefore, when the input V moves into a portion defined between lines ① and ④, the operation of the reactance relay becomes unstable, that is, the relay operates in the unstable operation zone. The portions beneath and above this unstable operation zone are the stable operation zone and the non-operating zone respectively. The characteristic of the relay of the present invention is compared with that of the prior art relay in FIG. 10c, in which ④ represents the characteristic line separating the stable operation zone from the unstable operation zone in the case of the prior art relay.

In order that the prior art relay shown in FIG. 1 can operate in its stable operation zone, it is necessary to apply two inputs of "1" level to the AND circuit 7, and, as a result, both of the flip-flops 6a and 6b must be in their set state. Thus, the characteristic line ④ in FIG. 10c indicates that "both of the positive polarity coincidence signal and the negative polarity coincidence signal represent an angle larger than 90°." In contrast, in order that the relay of the present invention can operate in its stable operation region, it is required that the flip-flop 8 in the final stage is not reset, and, as a result, one of the flip-flops 6a and 6b is to be in its set state. Thus, "one of the positive polarity coincidence signal and the negative polarity coincidence signal is only required to represent an angle larger than 90°." Therefore, comparison of the above condition required for operating the relay of the present invention in the stable operation zone with the condition required for operating the prior art relay in the stable operation zone clarifies that the relay of the present invention can operate with a higher allowance than the prior art relay. Since thus the relay of the present invention has a wider stable operation zone than the prior art relay whose characteristic line is indicated by ④, the characteristic line separating the stable operation zone from the unstable operation zone in the case of the relay of the present invention can be depicted between the line ④ and the ideal characteristic line ⑤.

Figure 10C:
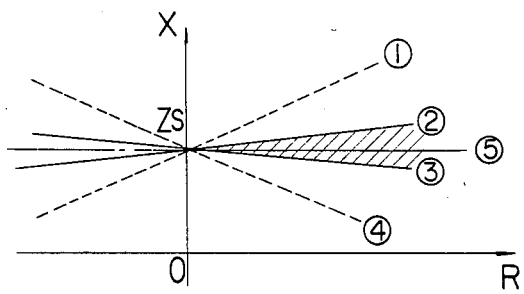
FIG. 10c illustrates how the unstable operation zone can be narrowed in the protective relay according to the present invention.

The boundary between the unstable operation zone and the non-operating zone will then be considered. The prior art relay shown in FIG. 1 does not operate when one of the flip-flops 6a and 6b is in its reset state. That is, it is required that "one of the positive polarity coincidence signal and the negative polarity coincidence signal represents an angle larger than 90°," and ① indicates the characteristic line in this case. The relay of the present invention does not operate when no output appears from the AND circuit 7a, and, for this purpose, both of the flip-flops 6a and 6b must be in their reset state. That is, it is required that "both of the positive polarity coincidence signal and the negative polarity coincidence signal represent an angle larger than 90°." It is more difficult to hold this condition than the condition of the characteristic line ①, that is, it is more difficult to hold the relay from becoming non-operative. Therefore, such a characteristic line ② can be depicted between the characteristic line ① and the ideal characteristic line ⑤ as seen in FIG. 10c.

This FIG. 10c will be described in further detail. In the case of the prior art relay shown in FIG. 1, the unstable operation zone occupies the portion defined between the lines ① and ④ when the logical circuit 7 is an OR circuit, while the unstable operation zone occupies the portion defined between the lines ② and ④ when the logical circuit 7 is an AND circuit. In contrast, in the case of the present invention, the unstable operation zone occupies the portion defined between the lines ② and ④ when the AND circuit 7a in FIGS. 4 or 7 generates its output of "1" level, while the unstable operation zone occupies the portion defined between the lines ① and ③ when the NOR circuit 7b generates its output of "1" level. The characteristic line ② defines the boundary between the non-operating zone and the unstable operation zone since the flip-flop 8 in the final stage is set by the AND circuit 7a, and the characteristic line ③ defines the boundary between the unstable operation zone and the stable operation zone since the flip-flop 8 is reset by the NOR circuit 7b. It is apparent that the unstable operation zone defined between the lines ② and ③ in the present invention is narrower than that in the prior art relay shown in FIG. 1, and the non-operating zone can thus be decreased to about ½ to ⅓ of the prior art one regardless of mixing of higher harmonics in the fundamental waveform inputs, according to the results of tests conducted by the inventors. Such a marked effect of the present invention can be exhibited without the use of powerful filters as the filters 2a and 2b for the removal of low-order higher harmonics, and, therefore, the time constant of the filters 2a and 2b need not be large. The unstable operation zone shown in FIG. 10c can be further narrowed when the filters are suitably designed to have the function of removing low-order higher harmonic although the time constant of the relay of the present invention will become slightly large.

We claim:

1. A protective relay comprising two first circuits generating two different square signals indicative of the phase difference between at least two sinusoidal inputs signals, two second circuits generating two square signals depending on the period of presence or absence of said first-mentioned two square signals respectively, and a third circuit including logical circuits for generating a single output representing the logical product or sum of said second-mentioned two square signals.

2. A protective relay as claimed in claim 1, wherein said at least two sinusoidal inputs are applied though suitable filters respectively.

3. A protective relay as claimed in claim 1, wherein said two square signals generated from said two first circuits are a square signal indicative of the period in which said at least two input signals have both a positive potential at the same time and a square signal indicative of the period in which said at least two input signals have both a negative potential at the same time.

4. A protective relay as claimed in claim 1, wherein said two second circuits include two flip-flops which are set as a result of comparison between a first period of time and one of the periods or the period of presence or absence of said square signals applied thereto and reset as a result of comparison between a second period of time and the other period or the period of absence or presence of said square signals applied thereto, respectively.

5. A protective relay as claimed in claim 1, wherein said two second circuits include two flip-flops which are set as a result of comparison between a first period of time and one of the periods or the period of presence or absence of said square signals applied thereto respectively, and, as a result of comparison between a second period of time and the other period or the period of absence or presence of said two square signals applied to said second circuits, one of said two flip-flops is reset depending on the polarity of the input signal applied to one of said first circuits.

6. A protective relay as claimed in claim 1, wherein said third circuit includes a flip-flop which is set by the output of an AND circuit receiving the two outputs of said second circuits and reset by the output of a NOR circuit receiving the two outputs of said 1 second circuits.

7. A protective relay as claimed in claim 4, wherein said third circuit includes a flip-flop which is set by the output of an AND circuit connected to the outputs of said two flip-flops and reset by the output of a NOR circuit connected to the outputs of said two flip-flops.

8. A protective relay as claimed in claim 5, wherein said third circuit includes a flip-flop which is set by the output of an AND circuit connected to the outputs of said two flip-flops and reset by the output of a NOR circuit connected to the outputs of said two flip-flops.

9. A protective relay comprising a first and a second phase detection comparator generating two different square signals indicative of the phase difference between at least two sinusoidal inputs signals, a first and a second timer receiving said square signals generated from said first and second phase detection comparators respectively and generating their output signals as a result of comparison between a first period of time and one of the periods or the period of presence or absence of said square signals, a third timer receiving the same square signal as that applied to said first timer and generating its output signal as a result of comparison between a second period of time and the other period or the period of absence or presence of said square signal, a fourth timer receiving the same square signal as that applied to said second timer and generating its output signal as a result of comparison between the second period of time and the other period or the period of absence or presence of said square signal, a first flip-flop set by said first timer and reset by said third timer, a second flip-flop set by said second timer and reset by said fourth timer, and a third flip-flop set and reset by an AND circuit and a NOR circuit connected to the outputs of said first and second flip-flops respectively.

10. A protective relay comprising a first and a second phase detection comparator generating two different-phase square signals indicative of the phase difference between at least two sinusoidal inputs signals, a first and a second timer receiving said square signals generated from said first and second phase detection comparators respectively and generating their output signals as a result of comparison between a first period of time and one of the periods or the period of presence or absence of said square signals, a third timer acting as OR means for said square signals generated from said first and second phase detection comparators and generating its output signal as a result of comparison between a second period of time and the other period or the period of absence or presence of said square signals, a selector circuit selecting the output of said third timer depending on the polarity of one of said sinusoidal input signals thereby generating two outputs, a first flip-flop set by said first timer and reset by one of the outputs of said selector circuit, a second flip-flop set by said second timer and reset by the other output of said selector circuit, and a third flip-flop set and reset by an AND circuit and a NOR circuit connected to the outputs of said first and second flip-flops respectively.

* * * * *